US008131547B2

(12) United States Patent
Conkie et al.

(10) Patent No.: US 8,131,547 B2
(45) Date of Patent: *Mar. 6, 2012

(54) AUTOMATIC SEGMENTATION IN SPEECH SYNTHESIS

(75) Inventors: Alistair D. Conkie, Morristown, NJ (US); Yeon-Jun Kim, Whippany, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/544,576

(22) Filed: Aug. 20, 2009

(65) Prior Publication Data

US 2009/0313025 A1 Dec. 17, 2009

Related U.S. Application Data

(63) Continuation of application No. 11/832,262, filed on Aug. 1, 2007, now Pat. No. 7,587,320, which is a continuation of application No. 10/341,869, filed on Jan. 14, 2003, now Pat. No. 7,266,497.

(60) Provisional application No. 60/369,043, filed on Mar. 29, 2002.

(51) Int. Cl.
*G10L 15/14* (2006.01)

(52) U.S. Cl. ........ 704/256; 704/253; 704/258; 704/266; 704/231; 704/243

(58) Field of Classification Search .................. 704/256, 704/254, 246, 232, 258, 255, 245, 202, 240, 704/253, 256.1, 256.2
See application file for complete search history.

(56) References Cited

U.S. PATENT DOCUMENTS

| | | | | | |
|---|---|---|---|---|---|
| 5,317,673 | A | * | 5/1994 | Cohen et al. | 704/232 |
| 5,390,278 | A | | 2/1995 | Gupta et al. | |
| 5,579,436 | A | * | 11/1996 | Chou et al. | 704/244 |
| 5,623,609 | A | * | 4/1997 | Kaye et al. | 704/255 |
| 5,625,749 | A | * | 4/1997 | Goldenthal et al. | 704/254 |
| 5,655,058 | A | * | 8/1997 | Balasubramanian et al. | 704/255 |
| 5,687,287 | A | * | 11/1997 | Gandhi et al. | 704/247 |
| 5,745,600 | A | | 4/1998 | Chen et al. | |
| 5,812,975 | A | | 9/1998 | Komori et al. | |
| 5,839,105 | A | | 11/1998 | Ostendorf et al. | |
| 5,845,047 | A | | 12/1998 | Fukada et al. | |

(Continued)

FOREIGN PATENT DOCUMENTS

EP 1 035 537 9/2000

OTHER PUBLICATIONS

Brugnara, F. et al., "Automatic Segmentation and Labeling of Speech Based on Hidden Markov Models", Speech Communication, vol. 12, No. 4, Aug. 1, 1993, pp. 357-370.

(Continued)

*Primary Examiner* — Vijay B Chawan

(57) ABSTRACT

A method and system are disclosed that automatically segment speech to generate a speech inventory. The method includes initializing a Hidden Markov Model (HMM) using seed input data, performing a segmentation of the HMM into speech units to generate phone labels, correcting the segmentation of the speech units. Correcting the segmentation of the speech units includes re-estimating the HMM based on a current version of the phone labels, embedded re-estimating of the HMM, and updating the current version of the phone labels using spectral boundary correction. The system includes modules configured to control a processor to perform steps of the method.

20 Claims, 2 Drawing Sheets

U.S. PATENT DOCUMENTS

| | | | | |
|---|---|---|---|---|
| 5,913,192 | A * | 6/1999 | Parthasarathy et al. | 704/256.1 |
| 5,913,193 | A | 6/1999 | Huang et al. | |
| 6,076,057 | A * | 6/2000 | Narayanan et al. | 704/256.2 |
| 6,163,769 | A | 12/2000 | Acero et al. | |
| 6,202,047 | B1 * | 3/2001 | Ephraim et al. | 704/256.6 |
| 6,208,967 | B1 * | 3/2001 | Pauws et al. | 704/256.8 |
| 6,292,778 | B1 * | 9/2001 | Sukkar | 704/256.4 |
| 6,317,716 | B1 | 11/2001 | Braida et al. | |
| 6,430,532 | B2 | 8/2002 | Holzapfel | |
| 6,539,354 | B1 | 3/2003 | Sutton et al. | |
| 6,665,641 | B1 | 12/2003 | Coorman et al. | |
| 6,928,407 | B2 * | 8/2005 | Ponceleon et al. | 704/253 |
| 6,965,861 | B1 * | 11/2005 | Dailey et al. | 704/242 |
| 7,089,185 | B2 * | 8/2006 | Nefian | 704/256 |
| 7,120,575 | B2 * | 10/2006 | Haase et al. | 704/207 |
| 7,165,030 | B2 | 1/2007 | Yi et al. | |
| 7,266,497 | B2 * | 9/2007 | Conkie et al. | 704/258 |
| 7,444,282 | B2 * | 10/2008 | Choo et al. | 704/202 |
| 7,496,512 | B2 * | 2/2009 | Zhao et al. | 704/249 |
| 7,587,320 | B2 * | 9/2009 | Conkie et al. | 704/256 |
| 7,664,642 | B2 * | 2/2010 | Espy-Wilson et al. | 704/254 |

OTHER PUBLICATIONS

Toledano, D.T., "Neural Network Boundary Refining for Automatic Speech Segmentation", 2000 IEEE International Conference on Acoustics, Speech and Signal, vol. 6, Jun. 5, 2000, pp. 3438-3441.

Hon, H. et al., "Automatic Generation of Synthesis Units for Trainable Text-to-Speech Systems", Acoustics, Speech and Signal Processing, 1998, Proceedings of the 1998 IEEE International Conference on Seattle, WA, May 12-15, 1998, pp. 293-296.

* cited by examiner

AUTOMATIC SEGMENTATION IN SPEECH SYNTHESIS

RELATED APPLICATIONS

This application is a continuation of U.S. patent application Ser. No. 11/832,262, filed Aug. 1, 2007, which is a continuation of U.S. patent application Ser. No. 10/341,869, filed Jan. 14, 2003, now U.S. Pat. No. 7,266,497, which claims the benefit of U.S. Provisional Patent Application Ser. No. 60/369,043 entitled "System and Method of Automatic Segmentation for Text to Speech Systems" and filed Mar. 29, 2002, which are incorporated herein by reference in their entirety.

BACKGROUND

Technical Field

The present disclosure relates to systems and methods for automatic segmentation in speech synthesis. More particularly, the present disclosure relates to systems and methods for automatic segmentation in speech synthesis by combining a Hidden Markov Model (HMM) approach with spectral boundary correction.

The Relevant Technology

One of the goals of text-to-speech (TTS) systems is to produce high-quality speech using a large-scale speech corpus. TTS systems have many applications and, because of their ability to produce speech from text, can be easily updated to produce a different output by simply altering the textual input. Automated response systems, for example, often utilize TTS systems that can be updated in this manner and easily configured to produce the desired speech. TTS systems also play an integral role in many automatic speech recognition (ASR) systems.

The quality of a TTS system is often dependent on the speech inventory and on the accuracy with which the speech inventory is segmented and labeled. The speech or acoustic inventory usually stores speech units (phones, diphones, half-phones, etc.) and during speech synthesis, units are selected and concatenated to create the synthetic speech. In order to achieve high quality synthetic speech, the speech inventory should be accurately segmented and labeled in order to avoid noticeable errors in the synthetic speech.

Obtaining a well segmented and labeled speech inventory, however, is a difficult and time consuming task. Manually segmenting or labeling the units of a speech inventory cannot be performed in real time speeds and may require on the order of 200 times real time to properly segment a speech inventory. Accordingly, it will take approximately 400 hours to manually label 2 hours of speech. In addition, consistent segmentation and labeling of a speech inventory may be difficult to achieve if more than one person is working on a particular speech inventory. The ability to automate the process of segmenting and labeling speech would clearly be advantageous.

In the development of both ASR and TTS systems, automatic segmentation of a speech inventory plays an important role in significantly reducing reduce the human effort that would otherwise be require to build, train, and/or segment speech inventories. Automatic segmentation is particularly useful as the amount of speech to be processed becomes larger.

Many TTS systems utilize a Hidden Markov Model (HMM) approach to perform automatic segmentation in speech synthesis. One advantage of a HMM approach is that it provides a consistent and accurate phone labeling scheme. Consistency and accuracy are critical for building a speech inventory that produces intelligible and natural sounding speech. Consistent and accurate segmentation is particularly useful in a TTS system based on the principles of unit selection and concatenative speech synthesis.

Even though HMM approaches to automatic segmentation in speech syntheses have been successful, there is still room for improvement regarding the degree of automation and accuracy. As previously stated, there is a need to reduce the time and cost of building an inventory of speech units. This is particularly true as a demand for more synthetic voices, including customized voices, increases. This demand has been primarily satisfied by performing the necessary segmentation work manually, which significantly lengthens the time required to build the speech inventories.

For example, hand-labeled bootstrapping may require a month of labeling by a phonetic expert to prepare training data for speaker-dependent HMMs (SD HMMs). Although hand-labeled bootstrapping provides quite accurate phone segmentation results, the time required to hand label the speech inventory is substantial. In contrast, bootstrapping automatic segmentation procedures with speaker-independent HMMs (SI HMMs) instead of SD HMMs reduces the manual workload considerably while keeping the HMMs stable. Even when SI HMMs are used, there is still room for improving the segmentation accuracy and degree of segmentation automation.

Another concern with regard to automatic segmentation is that the accuracy of the automatic segmentation determines, to a large degree, the quality of speech that is synthesized by unit selection and concatenation. An HMM-based approach is somewhat limited in its ability to remove discontinuities at concatenation points because the Viterbi alignment used in an HMM-based approach tries to find the best HMM sequence when given a phone transcription and a sequence of HMM parameters rather than the optimal boundaries between adjacent units or phones. As a result, an HMM-based automatic segmentation system may locate a phone boundary at a different position than expected, which results in mismatches at unit concatenation points and in speech discontinuities. There is therefore a need to improve automatic segmentation.

BRIEF SUMMARY

The present disclosure overcomes these and other limitations and relates to systems and methods for automatically segmenting a speech inventory. More particularly, the present disclosure relates to systems and methods for automatically segmenting phones and more particularly to automatically segmenting a speech inventory by combining an HMM-based approach with spectral boundary correction.

In one embodiment, automatic segmentation begins by bootstrapping a set of HMMs with speaker-independent HMMs. The set of HMMs is initialized, re-estimated, and aligned to produce the labeled units or phones. The boundaries of the phone or unit labels that result from the automatic segmentation are corrected using spectral boundary correction. The resulting phones are then used as seed data for HMM initialization and re-estimation. This process is performed iteratively.

A phone boundary is defined, in one embodiment, as the position where the maximal concatenation cost concerning spectral distortion is located. Although Euclidean distance between mel frequency cepstral coefficients (MFCCs) is often used to calculate spectral distortions, the present disclosure utilizes a weighted slop metric. The bending point of a spectral transition often coincides with a phone boundary. The spectral-boundary-corrected phones are then used to initialize, re-estimate and align the HMMs iteratively. In other words, the labels that have been re-aligned using spectral boundary correction are used as feedback for iteratively training the HMMs. In this manner, misalignments between target phone boundaries and boundaries assigned by automatic segmentation can be reduced.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

A more particular description of the disclosure briefly described above will be rendered by reference to specific embodiments thereof which are illustrated in the appended drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Speech inventories are used, for example, in text-to-speech (TTS) systems and in automatic speech recognition (ASR) systems. The quality of the speech that is rendered by concatenating the units of the speech inventory represents how well the units or phones are segmented. The present disclosure relates to systems and methods for automatically segmenting speech inventories and more particularly to automatically segmenting a speech inventory by combining an HMM-based segmentation approach with spectral boundary correction. By combining an HMM-based segmentation approach with spectral boundary correction, the segmental quality of synthetic speech in unit-concatenative speech synthesis is improved.

An exemplary HMM-based approach to automatic segmentation usually includes two phases: training the HMMs, and unit segmentation using the Viterbi alignment. Typically, each phone or unit is defined as an HMM prior to unit segmentation and then trained with a given phonetic transcription and its corresponding feature vector sequence. TTS systems often require more accuracy in segmentation and labeling than do ASR systems.

Figure 1:
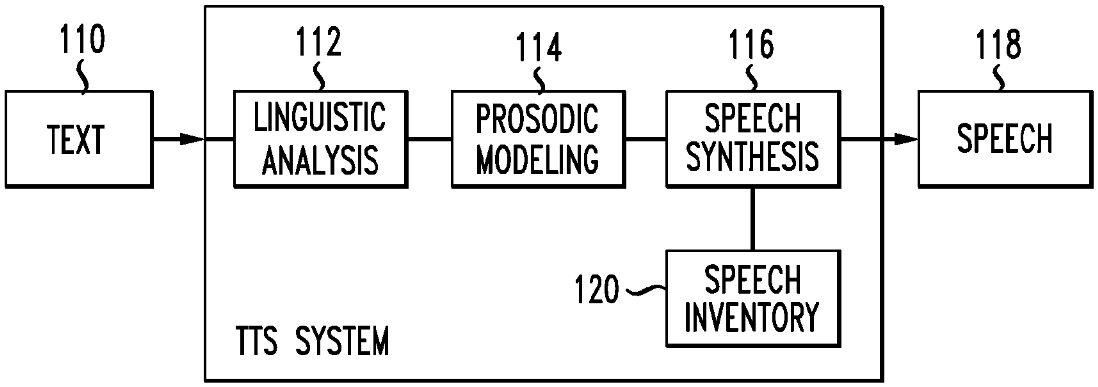
FIG. 1 illustrates a text-to-speech system that converts textual input to audible speech.

FIG. 1 illustrates an exemplary TTS system that converts text to speech. In FIG. 1, the TTS system 100 converts the text 110 to audible speech 118 by first performing a linguistic analysis 112 on the text 110. The linguistic analysis 112 includes, for example, applying weighted finite state transducers to the text 110. In prosodic modeling 114, each segment is associated with various characteristics such as segment duration, syllable stress, accent status, and the like. Speech synthesis 116 generates the synthetic speech 118 by concatenating segments of natural speech from a speech inventory 120. The speech inventory 120, in one embodiment, usually includes a speech waveform and phone labeled data.

The boundary of a unit (phone, diphone, etc.) for segmentation purposes is defined as being where one unit ends and another unit begins. For the speech to be coherent and natural sounding, the segmentation must occur as close to the actual unit boundary as possible. This boundary often naturally occurs within a certain time window depending on the class of the two adjacent units. In one embodiment of the present disclosure, only the boundaries within these time windows are examined during spectral boundary correction in order to obtain more accurate unit boundaries. This prevents a spurious boundary from being inadvertently recognized as the phone boundary, which would lead to discontinuities in the synthetic speech.

Figure 2:
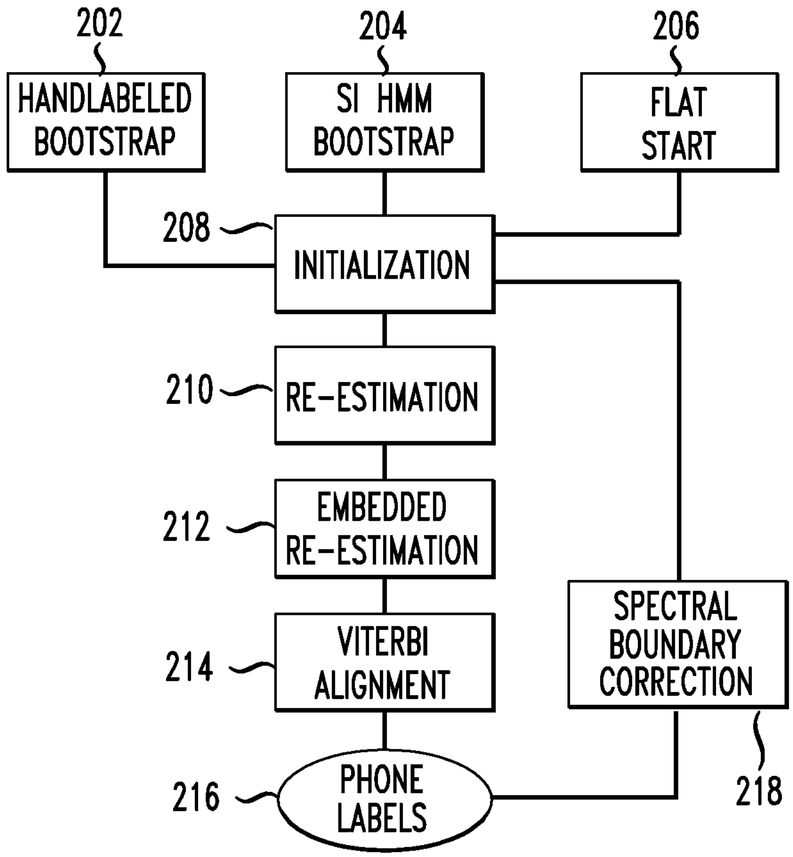
FIG. 2 illustrates an exemplary method for automatic segmentation using spectral boundary correction with an HMM approach.

FIG. 2 illustrates an exemplary method for automatically segmenting phones or units and illustrates three examples of seed data to begin the initialization of a set of HMMs. Seed data can be obtained using, for example: hand-labeled bootstrap 202, speaker-independent (SI) HMM bootstrap 204, and a flat start 206. Hand-labeled bootstrapping, which utilizes a specific speaker's hand-labeled speech data, results in the most accurate HMM modeling and is often called speaker-dependent HMM (SD HMM). While SD HMMs are generally used for automatic segmentation in speech synthesis, they have the disadvantage of being quite time-consuming to prepare. One advantage of the present disclosure is to reduce the amount of time required to segment the speech inventory.

If hand-labeled speech data is available for a particular language, but not for the intended speaker, bootstrapping with SI HMM alignment is the best alternative. In one embodiment, SI HMMs for American English, trained with the TIMIT speech corpus, were used in the preparation of seed phone labels. With the resulting labels, SD HMMs for an American male speaker were trained to provide the segmentation for building an inventory of synthesis units. One advantage of bootstrapping with SI HMMs is that all of the available speech data can be used as training data if necessary.

In this example, the automatic segmentation system includes ARPA phone HMMs that use three-state left-to-right models with multiple mixture of Gaussian density. In this example, standard HMM input parameters, which include twelve MFCCs (Mel frequency cepstral coefficients), normalized energy, and their first and second order delta coefficients, are utilized.

Using one hundred randomly chosen sentences, the SD HMMs bootstrapped with SI HMMs result in phones being labeled with an accuracy of 87.3% (<20 ms, compared to hand labeling). Many errors are caused by differences between the speaker's actual pronunciations and the given pronunciation lexicon, i.e., errors by the speaker or the lexicon or effects of spoken language such as contractions. Therefore, speaker-individual pronunciation variations have to be added to the lexicon.

FIG. 2 illustrates a flow diagram for automatic segmentation that combines an HMM-based approach with iterative training and spectral boundary correction. Initialization 208 occurs using the data from the hand-labeled bootstrap 202, the SI HMM bootstrap 204, or from a flat start 206. After the HMMs are initialized, the HMMs are re-estimated (210). Next, embedded re-estimation 212 is performed. These actions—initialization 208, re-estimation 210, and embedded re-estimation 212—are an example of how HMMs are trained from the seed data.

After the HMMs are trained, a Viterbi alignment 214 is applied to the HMMs in one embodiment to produce the phone labels 216. After the HMMs are aligned, the phones are labeled and can be used for speech synthesis. In FIG. 2, however, spectral boundary correction is applied to the resulting phone labels 216. Next, the resulting phones are trained and aligned iteratively. In other words, the phone labels that have been re-aligned using spectral boundary correction are used as input to initialization 208 iteratively. The hand-labeled bootstrapping 202, SI HMM bootstrapping 204, and the flat start 206 are usually used the first time the HMMs are trained. Successive iterations use the phone labels that have been aligned using spectral boundary correction 218.

The motivation for iterative HMM training is that more accurate initial estimates of the HMM parameters produce more accurate segmentation results. The phone labels that result from bootstrapping with SI HMMs are more accurate than the original input (seed phone labels). For this reason, for tuning the SD HMMs to produce the best results, the phone labels resulting from the previous iteration and corrected using spectral boundary correction 218 are used as the input for HMM initialization 208 and re-estimation 210, as shown in FIG. 2. This procedure is iterated to fine-tune the SD HMMs in this example.

After several rounds of iterative training that includes spectral boundary correction, mismatches between manual labels and phone labels assigned by an HMM-based approach will be considerably reduced. For example, when the HMM training procedure illustrated in FIG. 2 was iterated five times in one example, an accuracy of 93.1% was achieved, yielding a noticeable improvement in synthesis quality. The accuracy of phone labeling in a few speech samples alone cannot predict synthetic quality itself. The stop condition for iterative training, therefore, is defined as the point when no more perceptual improvement of synthesis quality can be observed.

A reduction of mismatches between phone boundary labels is expected when the temporal alignment of the feed-back labeling is corrected. Phone boundary corrections can be done manually or by rule-based approaches. Assuming that the phone labels assigned by an HMM-based approach are relatively accurate, automatic phone boundary correction concerning spectral features improves the accuracy of the automatic segmentation.

One advantage of the present disclosure is to reduce or minimize the audible signal discontinuities caused by spectral mismatches between two successive concatenated units. In unit-concatenative speech synthesis, a phone boundary can be defined as the position where the maximal concatenation cost concerning spectral distortion, i.e., the spectral boundary, is located. The Euclidean distance between MFCCs is most widely used to calculate spectral distortions. As MFCCs were likely used in the HMM-based segmentation, the present embodiment uses instead the weighted slope metric (see Equation (1) below).

$$d(S^L, S^R) = u_E|E_{S^L} - E_{S^R}| + \sum_{i=1}^{K} u(i)[\Delta_{S^L}(i) - \Delta_{S^R}(i)]^2 \quad (1)$$

In this example, $S^L$ and $S^R$ are 256 point FFTs (fast Fourier transforms) divided into K critical bands. The $S^L$ and $S^R$ vectors represent the spectrum to the left and the right of the boundary, respectively. $E_{S^L}$, and $E_{S^R}$ are spectral energy, $\Delta_{S^L}$(i) and $\Delta_{S^R}$(i) are the ith critical band spectral slopes of $S^L$ and $S^R$ (see FIG. 3), and $u_E$, u(i) are weighting factors for the spectral energy difference and the ith spectral transition.

Figure 3:
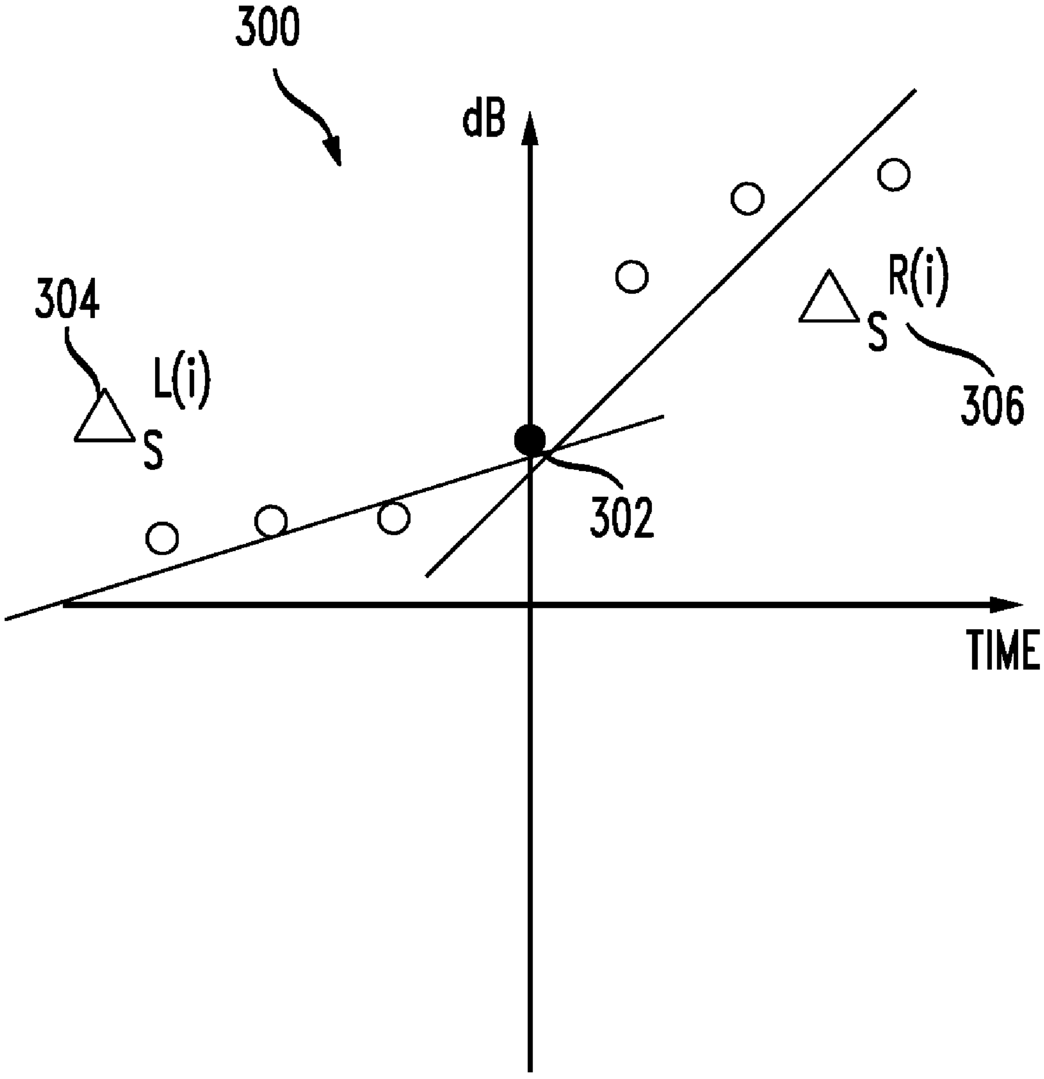
FIG. 3 illustrates a bending point of a spectral transition that coincides with a phone boundary in one embodiment.

Spectral transitions play an important role in human speech perception. The bending point of spectral transition, i.e., the local maximum of $$\sum_{i=1}^{K} u(i)[\Delta_{S^L}(i) - \Delta_{S^R}(i)]^2,$$

often coincides with a phone boundary. FIG. 3, which illustrates adjacent spectral slopes, more fully illustrates the bending point of a spectral transition. In this example, the spectral slope 304 corresponds to the ith critical band of $S^L$, and the spectral slope 306 corresponds to the ith critical band of $S^R$. The bending point 302 of the spectral transition usually coincides with a phone boundary. Using spectral boundaries identified in this fashion, spectral boundary correction 218 can be applied to the phone labels 216, as illustrated in FIG. 2.

In the present embodiment, $|E_{S^L} - E_{S^R}|$, which is the absolute energy difference in Equation (1), is modified to distinguish K critical bands, as in Equation (2):

$$|E_{S^L} - E_{S^R}| = \sum_{j=1}^{K} w(j)^*|E_{S^L}(j) - E_{S^R}(j)| \quad (2)$$

where w(j) is the weight of the jth critical band. This is because each phone boundary is characterized by energy changes in different bands of the spectrum.

Although there is a strong tendency for the largest peak to occur at the correct phone boundary, the automatic detector described above may produce a number of spurious peaks. To minimize the mistakes in the automatic spectral boundary correction, a context-dependent time window in which the optimal phone boundary is more likely to be found is used. The phone boundary is checked only within the specified context-dependent time window.

Temporal misalignment tends to vary in time depending on the contexts of two adjacent phones. Therefore, the time window for finding the local maximum of spectral boundary distortion is empirically determined, in this embodiment, by the adjacent phones as illustrated in the following table. This table represents context-dependent time windows (in ms) for spectral boundary correction (V: Vowel, P: Unvoiced stop, B: Voiced stop, S: Unvoiced fricative, Z: Voiced fricative, L: Liquid, N: Nasal).

| BOUNDARY | Time window (ms) | BOUNDARY | Time window (ms) |
|---|---|---|---|
| V-V | −4.5 ± 50 | P-V | −1.6 ± 30 |
| V-N | −4.8 ± 30 | N-V | 0 ± 30 |
| V-B | −13.9 ± 30 | B-V | 0 ± 20 |
| V-L | −23.2 ± 40 | L-V | 11.1 ± 30 |
| V-P | 2.2 ± 20 | S-V | 2.7 ± 20 |
| V-Z | −15.8 ± 30 | Z-V | 15.4 ± 40 |

The present disclosure relates to a method for automatically segmenting phones or other units by combining HMM-based segmentation with spectral features using spectral boundary correction. Misalignments between target phone boundaries and boundaries assigned by automatic segmentation are reduced and result in more natural synthetic speech. In other words, the concatenation points are less noticeable and the quality of the synthetic speech is improved.

The embodiments of the present disclosure may comprise a special purpose or general purpose computer including various computer hardware, as discussed in greater detail below. Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Computer-executable instructions also include program modules which are executed by computers in stand alone or network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for automatic segmentation of speech to generate a speech inventory, the method comprising:

initializing, via a processor, a Hidden Markov Model (HMM) using seed input data;

performing a segmentation of the HMM into speech units to generate phone labels;

correcting, via the processor, the segmentation of the speech units by performing the steps:

re-estimating the HMM based on a current version of the phone labels;

embedded re-estimating of the HMM; and updating the current version of the phone labels using spectral boundary correction.

2. The method of claim 1, further comprising concatenating the speech units to synthesize speech.

3. The method of claim 2, further comprising iteratively performing the re-estimating, embedded re-estimating, and updating steps until no perceptual improvement of synthesis quality is detected between iterations.

4. The method of claim 1, wherein the seed input data is selected from the group consisting of hand-labeled bootstrapped data, speaker-independent HMM bootstrapped data, and flat start data.

5. The method of claim 1, further comprising adjusting boundaries of the phone labels within specified time windows.

6. The method of claim 1, further comprising identifying context-dependent time windows around speech unit boundaries, wherein the speech unit boundaries include one or more of:

a vowel-to-vowel boundary;
a vowel-to-nasal boundary;
a vowel-to-voiced stop boundary;
a vowel-to-liquid boundary;
a vowel-to-unvoiced stop boundary;
a vowel-to-voiced fricative boundary;
an unvoiced stop-to-vowel boundary;
a nasal-to-vowel boundary;
a voiced stop-to-vowel boundary
a liquid-to-vowel boundary;
an unvoiced fricative-to-vowel boundary; and
a voiced fricative-to-vowel boundary.

7. The method of claim 6, wherein the context-dependent time windows are empirically determined by adjacent phones.

8. A computer-readable storage medium storing a set of program instructions executable on a processor device and usable to reduce speech unit boundaries, the instructions causing the processing device to perform the steps:

aligning a trained set of HMMs to produce phone labels that are segmented, wherein each phone label has a spectral boundary;

performing a spectral boundary correction on the phone labels, wherein spectral boundary correction re-aligns each spectral boundary using bending points of spectral transitions; and synthesizing speech using the phone labels having spectral boundary correction.

9. The computer-readable storage medium of claim 8, wherein the instructions further comprise bootstrapping the set of HMMs with at least one of speaker-dependent HMMs and speaker-independent HMMs.

10. The computer-readable storage medium of claim 8, wherein the instructions further comprise:

initializing the set of HMMs;

re-estimating the set of HMMs; and performing embedded re-estimation on the set of HMMs.

11. The computer-readable storage medium of claim 10, wherein the instructions further comprise iteratively performing a first alignment on a trained set of HMMs to produce phone labels that are segmented and performing spectral boundary correction on the phone labels.

12. The computer-readable storage medium of claim 11, wherein the instructions further comprise training the set of HMMs using phone labels having boundaries that have been re-aligned using spectral boundary correction.

13. The computer-readable storage medium of claim 8, wherein the instruction further comprise performing a Viterbi alignment on the trained set of HMMs to produce phone labels that are segmented.

14. The computer-readable storage medium of claim 8, wherein the instructions further comprise performing spectral boundary correction on the phone labels within a context-dependent time window.

15. The computer-readable storage medium of claim 14, wherein the instructions further comprise determining empirically the context-dependent time window using adjacent phones.

16. The computer-readable storage medium of claim 8, wherein each spectral boundary is between a first phone class and a second phone class.

17. A system for automatic segmentation of speech to generate a speech inventory, the system comprising:

a processor;

a first module configured to control the processor to initialize a Hidden Markov Model (HMM) using seed input data;

a second module configured to control the processor to perform a segmentation of the HMM into speech units to generate phone labels;

a third module configured to control the processor to correct the segmentation of the speech units by performing the steps:

re-estimating the HMM based on a current version of the phone labels;

embedded re-estimating of the HMM; and updating the current version of the phone labels using spectral boundary correction.

18. The system of claim 17, further comprising a module configured to control the processor to concatenate the speech units to synthesize speech.

19. The system of claim 18, further comprising a module configured to control the processor to iteratively perform the re-estimating, embedded re-estimating, and updating steps until no perceptual improvement of synthesis quality is detected between iterations.

20. The system of claim 17, wherein the seed input data is selected from the group consisting of hand-labeled bootstrapped data, speaker-independent HMM bootstrapped data, and flat start data.

* * * * *

UNITED STATES PATENT AND TRADEMARK OFFICE

CERTIFICATE OF CORRECTION

PATENT NO. : 8,131,547 B2
APPLICATION NO. : 12/544576
DATED : March 6, 2012
INVENTOR(S) : Alistair D. Conkie and Yeon-Jun Kim It is certified that error appears in the above-identified patent and that said Letters Patent is hereby corrected as shown below:

In the Specification,

Column 1, line 61, "reducing reduce" should be changed to --reducing--;

In the Claims,

Column 8, line 34, "processor" should be changed to --processing--;

line 41, "spectral boundary correction" should be changed to --the spectral boundary correction--;

line 44, "having spectral" should be changed to --having the spectral--;

line 48, "set of HMMs" should be changed to --trained set of HMMs--;

line 52, "set of HMMs" should be changed to --trained set of HMMs--;

line 53, "set of HMMs" should be changed to --trained set of HMMs--;

line 54, "set of HMMs" should be changed to --trained set of HMMs--;

lines 61-62, "set of HMMs" should be changed to --trained set of HMMs--;

line 57, "a trained set" should be changed to --the trained set--;

line 65, "instruction" should be changed to --instructions--;

Column 9, line 2, "performing spectral" should be changed to --performing the spectral--.

Signed and Sealed this
Ninth Day of June, 2015

Michelle K. Lee
*Director of the United States Patent and Trademark Office*